United States Patent
Overpeck

(10) Patent No.: US 8,544,109 B2
(45) Date of Patent: Sep. 24, 2013

(54) METHODS AND SYSTEMS INVOLVING SURVEY ADMINISTRATION

(75) Inventor: Craig Alan Overpeck, Bluebell, PA (US)

(73) Assignee: So-Net M3 USA, Washington, DC (US)

( * ) Notice: Subject to any disclaimer, the term of this patent is extended or adjusted under 35 U.S.C. 154(b) by 452 days.

(21) Appl. No.: 12/539,670

(22) Filed: Aug. 12, 2009

(65) Prior Publication Data

US 2010/0043080 A1 Feb. 18, 2010

Related U.S. Application Data

(60) Provisional application No. 61/188,653, filed on Aug. 12, 2008.

(51) Int. Cl.
*H04L 9/00* (2006.01)

(52) U.S. Cl.
USPC .............. 726/28; 726/4; 705/7.32; 705/14.44

(58) Field of Classification Search
USPC ....................................................... 726/28, 4
See application file for complete search history.

(56) References Cited

U.S. PATENT DOCUMENTS

| | | | |
|---|---|---|---|
| 6,256,614 B1* | 7/2001 | Wecker et al. | 705/14.19 |
| 7,171,567 B1* | 1/2007 | Bayer et al. | 713/193 |
| 2006/0069921 A1* | 3/2006 | Camaisa et al. | 713/182 |
| 2008/0131860 A1* | 6/2008 | Redd et al. | 434/350 |
| 2009/0307033 A1* | 12/2009 | Pais et al. | 705/7 |
| 2010/0017862 A1* | 1/2010 | Kim et al. | 726/7 |

* cited by examiner

*Primary Examiner* — Jung Kim
*Assistant Examiner* — Tri Tran
(74) *Attorney, Agent, or Firm* — Cantor Colburn LLP

(57) ABSTRACT

A method includes authorizing a user to participate in a survey, generating a key associated with a user identifier and a survey identifier, sending the key to a user terminal, directing the user terminal to a survey uniform resource locator (URL), connecting communicatively with the user terminal via a second URL, determining whether the second URL designates the survey as completed, retrieving the encrypted key from the user terminal responsive to determining that the second URL designates the survey as completed, and updating the status of the survey in a memory responsive to verifying the integrity of the encrypted key.

18 Claims, 5 Drawing Sheets

Users ⸺ 402

| User_ID | Email address | Name | Second ID |
|---|---|---|---|
| 1AA | 1AA@mail.com | John Doe | 54321 |

Survey ⸺ 404

| Survey_ID | Metadata for qualification of participants | Survey URL |
|---|---|---|
| Z3 | Yes/No | www.survey.com |

Partners ⸺ 406

| Survey_ID | Partner_ID | Partner Info | Destination URL |
|---|---|---|---|
| Z3 | Partner A | | www.Partner A.com |

FIG. 4

Invite 408

| Survey_ID | User_ID | Status | Key |
|---|---|---|---|
| Z3 | 1AA | Started/ Terminated/ Completed | asdf12345 |

User Duplicate 410

| User_ID 1 | User_ID 2 | User_ID 3 |
|---|---|---|
| 1AA | 2WW | 3YY |

Partner Panel Invite 412

| Survey_ID | User_ID | Status | Partner_ID | Metadata ID | Key |
|---|---|---|---|---|---|
| Z3 | 1AA | Started/ Terminated/ Completed | Partner A | | asdf12345 |

METHODS AND SYSTEMS INVOLVING SURVEY ADMINISTRATION

CROSS REFERENCE TO RELATED APPLICATIONS

This application claims the benefit of U.S. Provisional Application No. 61/188,653, filed Aug. 12, 2008.

BACKGROUND

The present invention relates to survey administration, and particularly to administering surveys to a group of participants electronically. Surveys may include participants that are members of a variety of groups. Electronically administering surveys to members of different groups presents unique challenges.

A method and system for effectively and efficiently administering surveys is desired.

SUMMARY

According to one embodiment of the present invention, a method includes authorizing a user to participate in a survey, generating a key associated with a user identifier and a survey identifier, sending the key to a user terminal, directing the user terminal to a survey uniform resource locator (URL), connecting communicatively with the user terminal via a second URL, determining whether the second URL designates the survey as completed, retrieving the encrypted key from the user terminal responsive to determining that the second URL designates the survey as completed, and updating the status of the survey in a memory responsive to verifying the integrity of the encrypted key.

According to another embodiment of the present invention, a system comprises a user terminal, and a processor operative to authorize a user to participate in a survey, generate a key associated with a user identifier and a survey identifier, send the key to the user terminal, direct the user terminal to a survey uniform resource locator (URL), connect communicatively with the user terminal via a second URL, determine whether the second URL designates the survey as completed, retrieve the encrypted key from the user terminal responsive to determining that the second URL designates the survey as completed, and update the status of the survey in a memory responsive to verifying the integrity of the encrypted key.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIGS. 4 and 5 are tables used in the operation of the system of FIG. 1.

DETAILED DESCRIPTION

Surveys in a number of fields may be administered remotely to groups of users. For example, a user in a first group is sent an invitation to participate in a survey electronically. The invitation includes a uniform resource locator (URL) link that allows the user to begin a survey session. Users may be compensated for participating in the survey. A secure method and system that identifies users and verifies that a particular user is authorized to participate in a particular survey session is described below.

Figure 1:
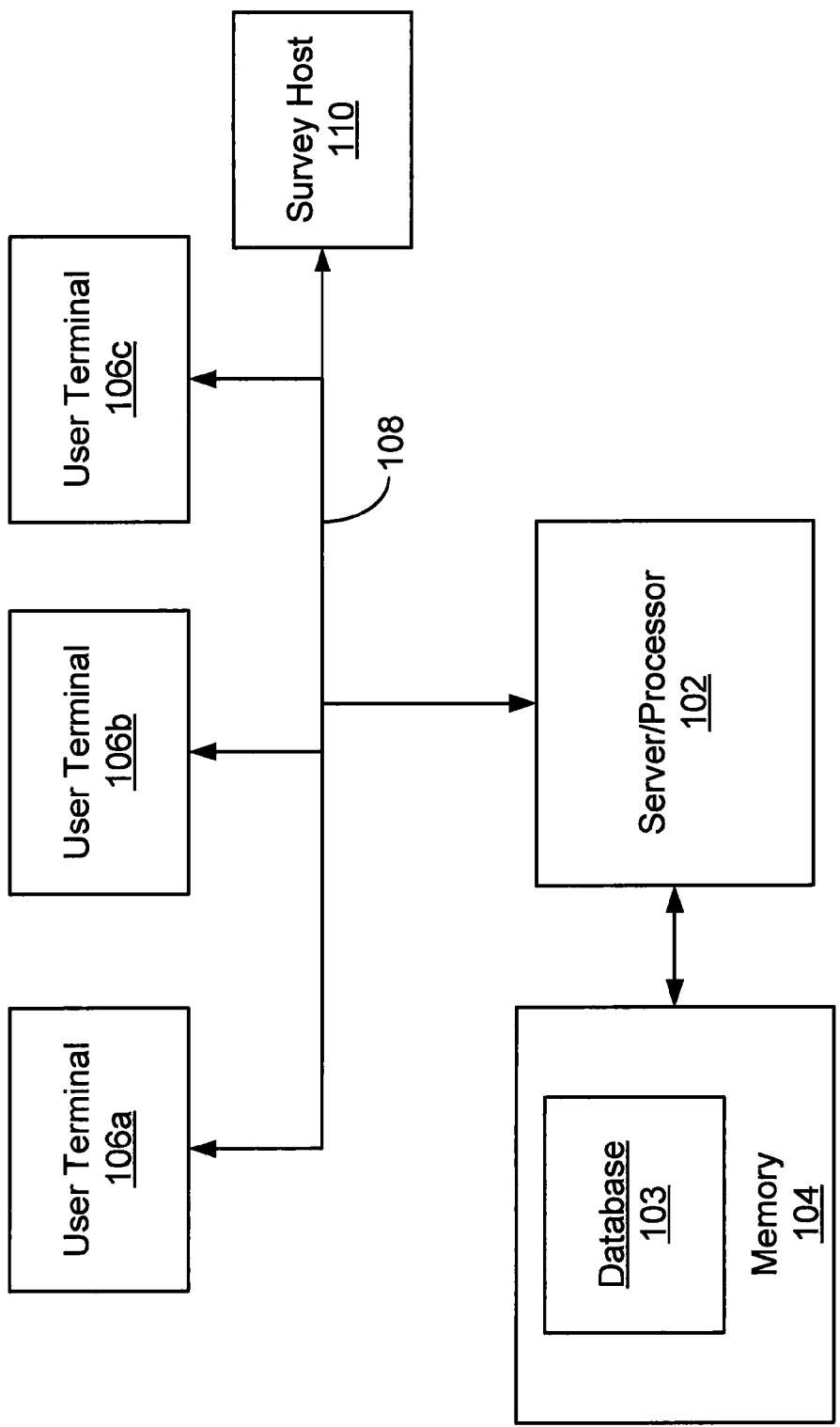
FIG. 1 illustrates an exemplary embodiment of a system.

In this regard, FIG. 1 illustrates an exemplary embodiment of a system. The system includes a server/processor 102 communicatively connected to a memory 104, that may store, for example, a database 103, a plurality of user terminals 106a-c communicatively connected to the server/processor 102, and a survey host 110 via a communication link 108. The communication link 108 may include, for example, the Internet, an intranet connection, or any other similar communications network.

Figure 2:
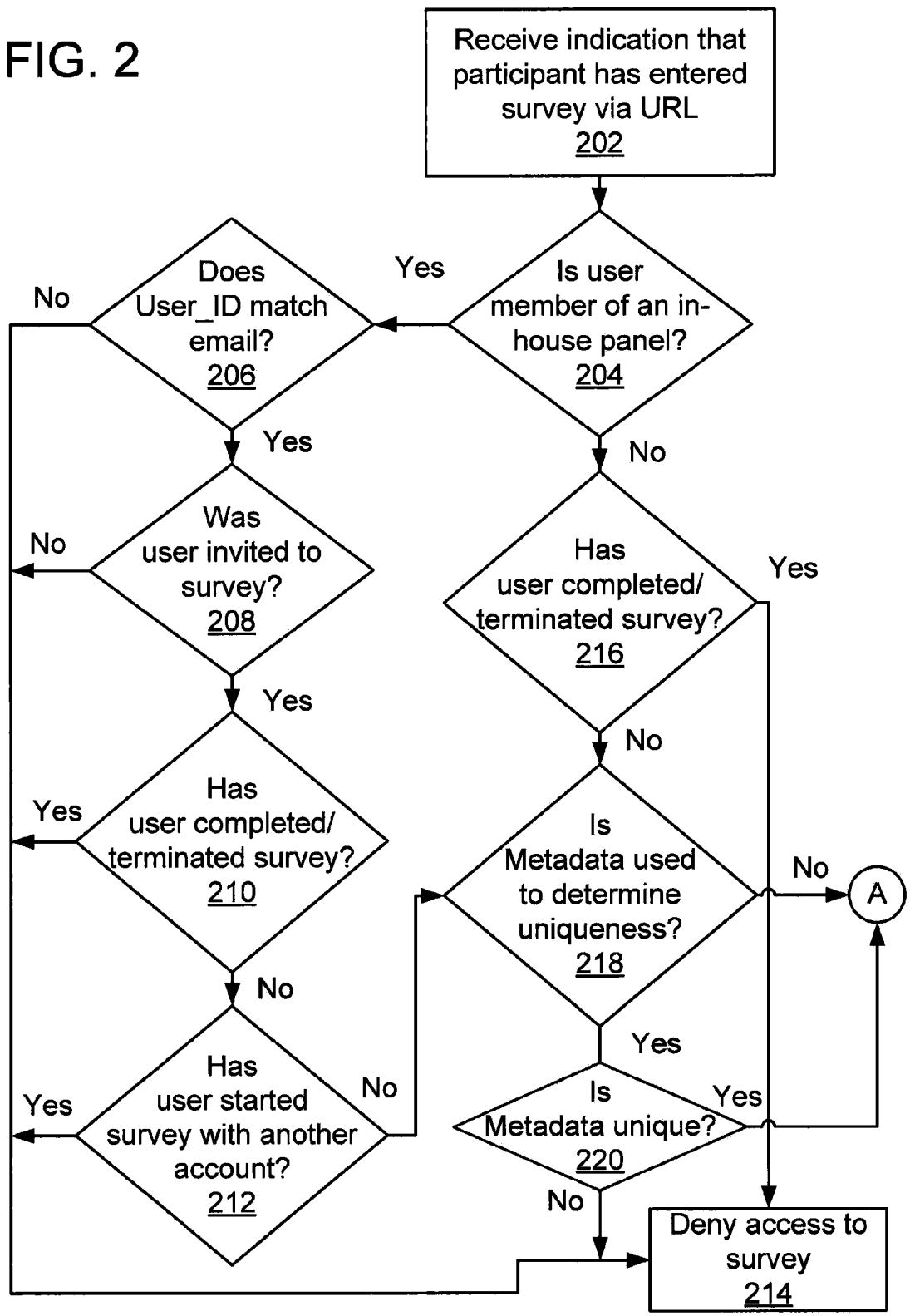
FIGS. 2 and 3 are block diagrams illustrating the operation of the system of FIG. 1.
Figure 3:
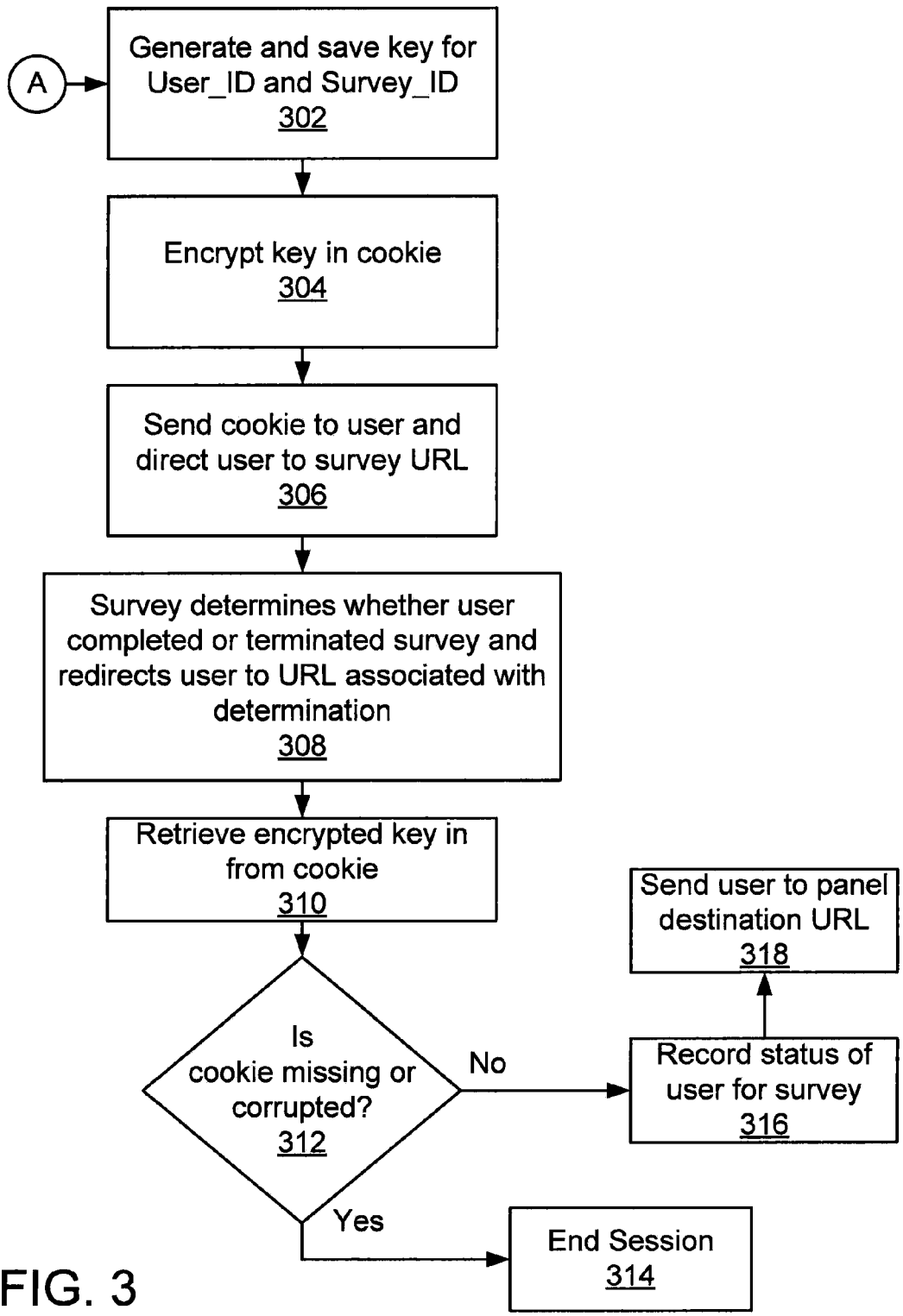

FIGS. 2 and 3 are block diagrams illustrating the operation of the system of FIG. 1. FIGS. 4 and 5 illustrate a number of tables that may be stored in the database 103. The tables in FIGS. 4 and 5 will be discussed in further detail below along with the operation of the system. In operation, a user is sent an invitation to participate in a survey session. The invitation may be in electronic format, such as, for example, an email message or may be a written invitation to a URL. The invitation may include a link having a URL. The URL may be unique to the invitation, and include, for example, a website address, an identifier of the survey (Survey_ID), an identifier of the user (User_ID), an email address of the user, and in some instances, an identifier of a group (Partner_ID) the user is pooled from. The group may include, for example, a group defined by an entity administrating the survey (an in-house group), or a group organized by another entity (a partner group). Metadata associated with a user in an in-house group may be more easily available, thus identifying a user as a member of an in-house group may be desirable when determining whether a user is authorized to participate in a session. The metadata may be used by some or all panels as a unique identifier of a user. Once a user accesses the URL in the invitation, the user is verified as being authorized to participate in the survey session. When the survey session ends, the system updates the status of the user with respect to the survey. The status information may be used to account for user participation in surveys.

Referring to FIG. 2, in block 202, the processor 102 (of FIG. 1) receives an indication that a participant has initiated communication between a user terminal 106 and the processor 102 via the invitation URL. In the illustrated example, the invitation URL includes a Survey_ID, a User_ID, an email address associated with the user, and in some instances a Partner_ID. The processor 102 determines whether the URL indicates that the user is a member of an in-house group (panel) in block 204. The determination may be made by comparing the Partner_ID listed in the URL to known in-house groups listed in the database 103; alternatively, the URL may not include a Partner_ID, and the processor 102 may determine by default that the user is a member of an in-house group. If the user is in an in-house group, in block 206, the processor 102 determines whether the User_ID matches the email address. A user table 402 (of FIG. 4) includes user data, for example, a User_ID, an email address, a name of the user, and a second ID (for example, a national medical registration number). If the User_ID does not match the email address in the table 402, the user is denied access to the survey session in block 214. In block 208, the processor 102 determines if the user has been invited to participate in the survey session. An invite table 408 (of FIG. 5) includes the Survey_ID, the User_ID, status of the survey session, and a key. If the User_ID is not associated with the Survey_ID in the invite table 408, the user has not been invited to the survey session, and the user is denied access to the survey session in block 214. The invite table 408 is used in block 210 to determine the status of the survey session with respect to the User_ID and the Survey_ID. If the status of the survey is "terminated" (i.e., The user started but did not complete the survey) or "completed," the user is denied access to the survey in block 214. In block 212, the user duplicate table 410 (of FIG. 5) is used to determine if the user has multiple User_IDs. If so, the status of other User_IDs in the invite table 408 are checked to verify that the other User_IDs do not have a "terminated" or "completed" status. The user is denied access to the survey in block 214 if the status is "terminated" or "completed."

Referring again to block 204, if the user is not a member of an in-house group, a partner panel invite table 412 (of FIG. 5) is used to verify that the status of the user is not "terminated" or "completed" with respect to the Survey_ID. If the status is not "terminated" or "completed," a survey table 404 (of FIG. 4) is used to determine whether the survey will use metadata associated with the User_IDs of the users to determine whether the user may participate in the survey session. If yes, the metadata is verified for uniqueness in block 220. The metadata is associated with a User_ID and may include, for example, a business or home address, a telephone number, a secondary identification number, such as a professional or national registration number, or other information about the user. Though a particular user may have multiple User_IDs (in some instances, from different groups), the metadata of a user should be unique. Thus, using the metadata to verify that a user has not previously participated in a survey session prevents a single user with multiple User_IDs from participating in a survey multiple times. If the metadata is not unique, the user is denied access to the survey in block 214.

Once a user is verified, the survey session is initiated. Referring to FIG. 3, a unique key associated with the User_ID and the Survey_ID is generated and saved. In the illustrated example, the key is saved in the invite table 408 (or the partner panel invite table 412 if the user is a member of a partner panel). The key allows the User_ID and the Survey_ID to be quickly identified. In block 304, the key is encrypted and placed in a cookie that may be used by, for example, an internet browser. In block 306 the cookie is sent to the internet browser that is being used by the user, and the user is directed to the survey URL (at the survey host 110 of FIG. 1). In the illustrated example, the internet browser of the user is redirected to the appropriate survey URL. Once the user is redirected to the survey URL, the user will either complete the survey or terminate the survey (without completing the survey). Upon completion the internet browser of the user is directed to a URL that is associated with completion; likewise upon termination, the browser is directed to a URL that is associated with termination in block 308. In block 310 the encrypted key is retrieved by the processor 102 from the cookie. If the cookie is missing or corrupted in block 312, the session is ended in block 314. If the cookie is not missing or corrupted, the status of the user ("completed" or "terminated") is saved in block 316. In block 318 the browser may be redirected to a destination URL that is stored in the partners table 406 (of FIG. 4.)

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:
1. A method comprising:
authorizing a user to participate in a survey;
generating a key associated with a user identifier and a survey identifier;
encrypting the key;
sending the encrypted key to a user terminal;
directing the user terminal to a survey uniform resource locator (URL);
connecting communicatively with the user terminal via a second URL;
determining whether the second URL designates the survey as completed;
retrieving the encrypted key from the user terminal responsive to determining that the second URL designates the survey as completed;
verifying the integrity of the key;
updating a status of the survey in a memory as completed responsive to verifying the integrity of the key;
terminating without updating the status of the survey in the memory as completed if the integrity of the key is not verified.

2. The method of claim 1, wherein the method further comprises retrieving the encrypted key from the user terminal responsive to determining that the second URL designates the survey as not-completed.

3. The method of claim 1, wherein the key is sent to the user terminal in a cookie.

4. The method of claim 1, wherein authorizing the user to participate in the survey includes:
   determining whether the user is a member of an in-house panel; and
   responsive to determining that the user is a member if an in-house panel:
      determining whether a user identifier is associated with an email address in a database; and
      denying the user access to the survey responsive to determining that the user identifier and the email address are not associated.

5. The method of claim 1, wherein authorizing the user to participate in the survey includes:
   determining whether the user is a member of an in-house panel; and
   responsive to determining that the user is a member if an in-house panel:
      determining whether the user has been invited to the survey; and
      denying the user access to the survey responsive to determining that the user has not been invited to the survey.

6. The method of claim 1, wherein authorizing the user to participate in the survey includes:
   determining whether the user is a member of an in-house panel; and
   responsive to determining that the user is a member if an in-house panel:
      determining whether the user has previously completed the survey; and
      denying the user access to the survey responsive to determining that the user has previously completed the survey.

7. The method of claim 1, wherein authorizing the user to participate in the survey includes:
   determining whether the user is a member of an in-house panel; and
   responsive to determining that the user is a member if an in-house panel:
      determining whether the user has previously terminated the survey; and
      denying the user access to the survey responsive to determining that the user has previously terminated the survey.

8. The method of claim 1, wherein authorizing the user to participate in the survey includes:
   determining whether the user is a member of an in-house panel; and
   responsive to determining that the user is a member if an in-house panel:
      determining whether the user has initiated the survey using another user account; and
      denying the user access to the survey responsive to determining that the user has initiated the survey using another user account.

9. The method of claim 1, wherein authorizing the user to participate in the survey includes:
   determining whether the user is a member of an in-house panel; and
   responsive to determining that the user is not a member if an in-house panel:
      determining whether the user has previously terminated the survey; and
      denying the user access to the survey responsive to determining that the user has previously terminated the survey.

10. The method of claim 1, wherein authorizing the user to participate in the survey includes:
    determining whether the user is a member of an in-house panel; and
    responsive to determining that the user is not a member if an in-house panel:
       comparing metadata associated with the user identifier with metadata associated with other user identifiers; and
       denying the user access to the survey responsive to determining that the metadata associated with the user identifier matches metadata associated with other user identifiers.

11. A system comprising:
    a user terminal; and
    a processor operative to perform operations including:
    authorizing a user to participate in a survey;
    generating a key associated with a user identifier and a survey identifier;
    encrypting the key;
    sending the encrypted key to a user terminal;
    directing the user terminal to a survey uniform resource locator (URL);
    connecting communicatively with the user terminal via a second URL;
    determining whether the second URL designates the survey as completed;
    retrieving the encrypted key from the user terminal responsive to determining that the second URL designates the survey as completed;
    verifying integrity of the key;
    updating a status of the survey in a memory as completed responsive to verifying the integrity of the key;
    terminating without updating the status of the survey in the memory as completed if the integrity of the key is not verified.

12. The system of claim 11, wherein the processor is further operative to retrieve the encrypted key from the user terminal responsive to determining that the second URL designates the survey as not-completed.

13. The system of claim 11, wherein the key is sent to the user terminal in a cookie.

14. The system of claim 11, wherein the authorizing the user to participate in the survey includes:
    determining whether the user is a member of an in-house panel; and
    responsive to determining that the user is a member if an in-house panel:
       determining whether a user identifier is associated with an email address in a database; and
       denying the user access to the survey responsive to determining that the user identifier and the email address are not associated.

15. The system of claim 11, wherein the authorizing the user to participate in the survey includes:
    determining whether the user is a member of an in-house panel; and
    responsive to determining that the user is a member if an in-house panel:
       determining whether the user has been invited to the survey; and denying the user access to the survey responsive to determining that the user has not been invited to the survey.

16. The system of claim 11, wherein the authorizing the user to participate in the survey includes:
- determining whether the user is a member of an in-house panel; and
- responsive to determining that the user is a member if an in-house panel:
  - determining whether the user has previously completed the survey; and
  - denying the user access to the survey responsive to determining that the user has previously completed the survey.

17. The system of claim 11, wherein the authorizing the user to participate in the survey includes:
- determining whether the user is a member of an in-house panel; and
- responsive to determining that the user is a member if an in-house panel:
  - determining whether the user has previously terminated the survey; and
  - denying the user access to the survey responsive to determining that the user has previously terminated the survey.

18. The system of claim 11, wherein the authorizing the user to participate in the survey includes:
- determining whether the user is a member of an in-house panel; and
- responsive to determining that the user is a member if an in-house panel:
  - determining whether the user has initiated the survey using another user account; and
  - denying the user access to the survey responsive to determining that the user has initiated the survey using another user account.

* * * * *